United States Patent [19]

Grigoli et al.

[11] Patent Number: 4,699,583
[45] Date of Patent: Oct. 13, 1987

[54] MACHINE FOR MANUFACTURING FROZEN FOOD PRODUCTS, IN PARTICULAR ICE CREAMS, ICE LOLLIES AND THE LIKE

[75] Inventors: Aldo Grigoli, Milan; Giorgio Ghioni, Campione d'Italia, both of Italy

[73] Assignee: Aigel S.r.l., Magenta Mi, Italy

[21] Appl. No.: 772,120

[22] Filed: Sep. 3, 1985

[51] Int. Cl.⁴ .................. A23G 9/16; B29C 39/38; B29C 39/04

[52] U.S. Cl. .................... 425/261; 62/345; 62/380; 198/465.2; 198/465.3; 198/803.2; 425/447; 425/453

[58] Field of Search .............. 425/126 S, 256, 259, 425/261, 453, 454, 447, 137; 62/63, 345, 380; 198/465.2, 465.3, 803.2; 141/82, 168, 170

[56] References Cited

U.S. PATENT DOCUMENTS 2,884,875  5/1959  Rasmussen ................. 62/345
4,330,245  5/1982  Billett et al. ............. 425/126 S Primary Examiner—Willard E. Hoag
Attorney, Agent, or Firm—Guido Modiano; Albert Josif

[57] ABSTRACT

This machine is in particular suitable for forming ice creams and/or popsicles or ice lollies with and without a holding stick, and comprises a freezing station and product metering and withdrawing units. The machine further comprises an intermittently advancing mechanism formed by at least one pair of frames movable with respect to each other and to a plurality of molds containing the product to be frozen to impress on the molds an intermittent forward movement. Preferably this mechanism comprises two pairs of movable frames arranged side-by-side and a transport member shifting the molds from one pair to the other. The metering and the withdrawing units are arranged side-by-side at two different pairs and the molds rest on the frames through support butts so as to ease substitution for other molds of different dimensions.

13 Claims, 8 Drawing Figures

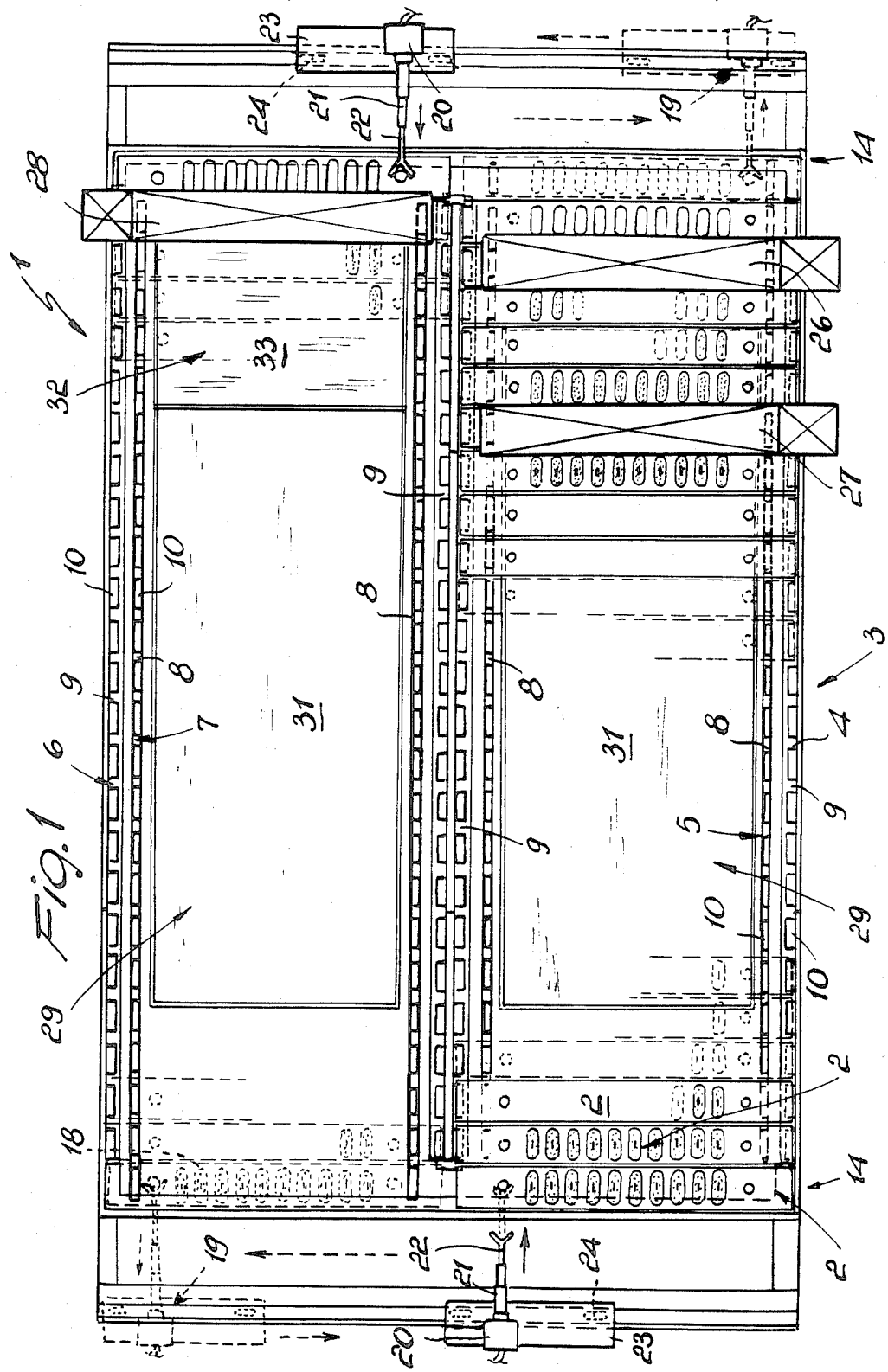

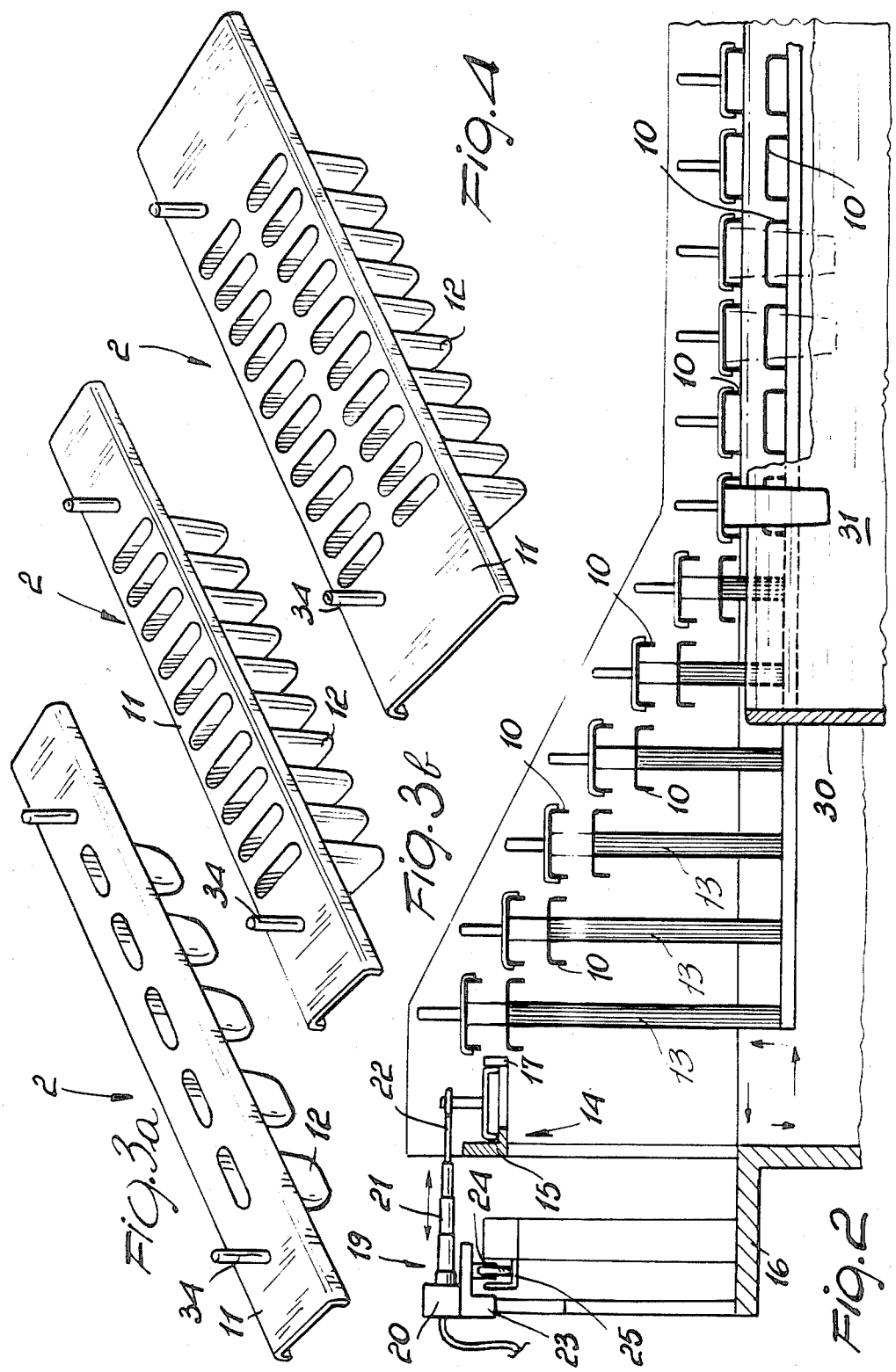

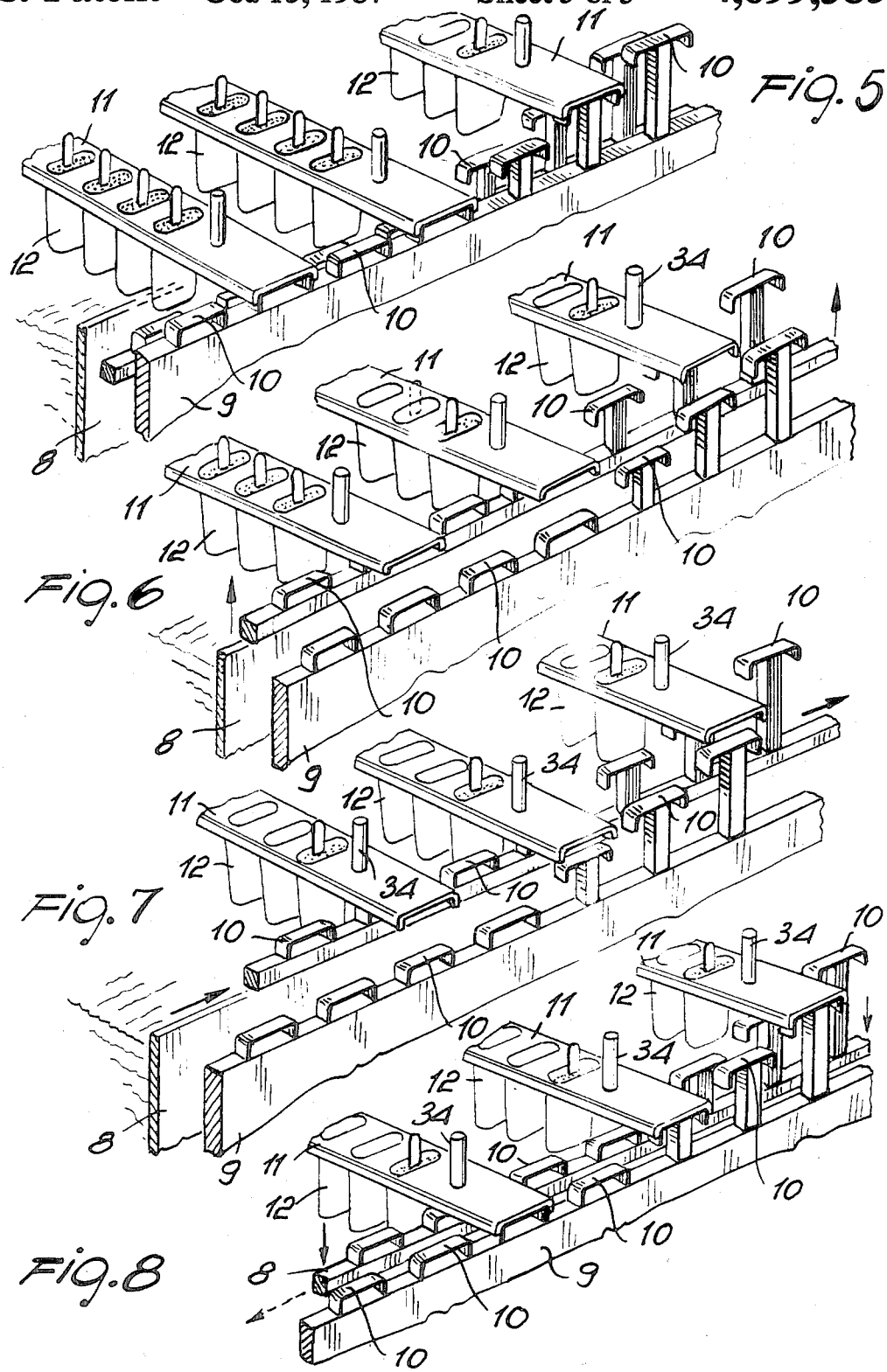

MACHINE FOR MANUFACTURING FROZEN FOOD PRODUCTS, IN PARTICULAR ICE CREAMS, ICE LOLLIES AND THE LIKE

BACKGROUND OF THE INVENTION

This invention relates to a machine for modelling products to be frozen, which is particularly useful in forming ice creams, popsicles, ice lollies and the like with and without a holding stick.

Known have been several types of ice cream- or popsicle-making machines; such machines may be divided susbtantially into two general classes: linear and rotary machines.

Linear machines generally comprise an active upper section where molds are entrained into a refrigeration tank, and a lower return section which is functionally devoted to taking the now empty molds to a filling device located at the start portion of the upper section.

To allow for an adequate mold entrainment speed and ensure a good production rate, said machines have a substantial length dimension which depends on the length of the active cooling stroke.

Such space requirements affect the icecream production economy on such machines in a twofold way: first, a large number of molds are required and at any given time, only one half of these will be actively operating, which results in problems when changing mold sizes and involves the availability of a large inventory of molds in different sizes; secondly, the molds are turned upside down during the return stroke, thereby loosing any ice cream mixture left in the molds and being contaminated by freezing solution.

The latter problem involves, in turn, a twofold increase in costs because the contamination from the freezing solution admixed to the remainder icecream requires that the molds be carefully flushed during the return stroke, which leads to a loss in the refrigeration units cumulated during the active stroke.

Rotary machines have, in turn, molds which are arranged radially so as to be presented beneath the filling, withdrawing, and stick dispensing devices on a straight line.

Such molds are rigid with a mold holder plate in the shape of a segment of a circle and require, on account of their complexity, an accurate and expensive machining which reflects significantly on the machine overall cost.

Machines of this type also exhibit, owing to the particular configuration of the mold holder plates, poor versatility since they disallow a quick and economical replacement of the molds.

SUMMARY OF THE INVENTION

In the light of these technical problems, it is a primary object of this invention to obviate such prior drawbacks by providing a machine for modelling products to be frozen, which has limited space requirements and a high production rate.

An important object of the invention is to provide a machine which has no problems of mold contamination from the freezing solution, thereby no flushing of the molds, and consequent loss of refrigerating units, is required during any portions of the production cycle.

Another object of the invention is to provide a machine for modelling products to be frozen, which is suitable for a medium to high production rate with a reduced number of molds.

A not unimportant object of the invention is to provide molds for this machine which are easy and economical to manufacture and apt to be readily replaced with the machine in operation.

These and other objects are achieved by a machine for modelling products to be frozen, which comprises a refrigerating means, means for forming and withdrawing said products, a plurality of molds cooperating with said refrigerating means and subjected to the action of a means for intermittently feeding said molds forward, characterized in that said means for intermittently advancing said molds comprises at least one pair of frames movable relatively to each other and to said molds.

BRIEF DESCRIPTION OF THE DRAWINGS

Further features and advantages of the invention will be apparent from the following detailed description of a preferred, but not exclusive, embodiment of a machine for modelling products to be frozen, equipped to form icecreams, as shown by way of illustration and not of limitation in the accompanying drawings, where:

FIG. 1 is a plan view of an ice cream-making machine according to the invention;

FIG. 2 is a longitudinal section through that same machine;

FIGS. 3a and 3b show molds with a simple row of trays;

FIG. 4 shows a mold with a double row of trays; and

FIGS. 5, 6, 7 and 8 illustrate the operation of the machine according to the invention.

DESCRIPTION OF THE PREFERRED EMBODIMENTS

With reference to the cited figures, the machine of this invention is designated generally with the reference numeral 1.

It comprises in summary a plurality of molds 2 overlying means 3 for intermittently feeding forward the molds. As visible from FIGS. 3a,3b and 4, the molds 2 comprise a plate 11 wherein cups or trays 12 are formed receiving a suitable amount of metered product.

Said means 3 comprise a first pair of frames 4 and 5 and a second pair of like frames 6 and 7.

The frames of both pairs are driven of relative motion; in particular, in the example being described, each pair have a fixed frame, 4 and 6 respectively, and a movable frame, respectively 5 and 7.

Both movable frames have two active portions or legs 8 arranged side-by-side within said fixed frames in a substantially parallel manner to corresponding legs 9 supporting the fixed frames; transport butts 10 being rigid with each of said legs.

Such transport butts are associated with the upper portion of the frames at regular intervals and preferably arranged on each frame at corresponding positions whereby, once the molds 2 are coupled to said transport butts, the molds arrange themselves substantially orthogonal to each of the legs.

The transport butts of the fixed frames 4 and 6 are in fact utilized to support the molds 2 by coupling to the ends of the plates 11.

The plate 11 and transport butts have, therefore, a mating profile so as to provide a sufficiently stable coupling to permit the intermittent forward motion of the molds on the frame itself. The transport butts are, at both ends of the frames, space apart vertically from the frames themselves by means of supporting studs 13 which have increasing heights toward said ends (FIG. 2).

That expedient allow for gradual raising of the molds for the purpose of arranging them on crosswise runways 14 for transferring the molds from the one to the other frame pair.

Said runways have substantially a first guide element 15 connected to a bed 16 of the ice cream making machine 1 and extending in a substantially orthogonal direction to the frames over the entire length of the machine 1, and a second guide element 17 parallel to the former but having passage areas 18 for the movable frames and the trays 12 of the molds 2.

On reaching said runways, the molds 2 which have pins 34 rigid orthogonally with the top face of the plate 11 (FIGS. 3a, 3b, 4), are subjected to the action of second intermittent forward movement means 19.

Said second means 19 preferably comprise a telescoping element 20 having an extensible arm 21 confronting the molds arranged on the runways 14, to the end of which there is attached a yoke 22 for engagement with one of the pins 34 of each mold.

That telescoping element 20 is connected to a carriage 23 running, through wheels 24, on a slide 25 parallel to the runways 14 and supported on the bed 16.

Known, and accordingly not shown, means translate the carriage and withdraw the arm 21 on preset commands.

Arranged upwardly of said frames, at one end of the same, there are further provided a metering assembly 26 followed, in the direction of the mold path, by a stick dispensing assembly 27.

At the corresponding end of the frame pair adjacent to that overlaid by said assemblies 26,27 there is also mounted a puller 28 adapted to grip the sticks of the now formed icecreams and pull the icecreams out of the molds to convey them to packaging.

Refrigeration means 29 remove heat from the trays 12 and consequently from the product contained therein.

Said means 29 comprise tanks 30 arranged at areas included between the active legs of the movable frames, within which a cooling solution 31 is caused to circulate.

In an area underlying the puller 28, said tanks are replaced with a defrosting tank 32 containing a hot fluid 33 effective to cause surface thawing of the icecream adhering on the walls of the trays in order to facilitate the withdrawal of the formed icecream.

FIG. 4 show a mold with double row of trays.

That mold, similar in conception to those shown in FIGS. 3a and 3b and accordingly having the same numbering, has, with respect to the molds with a single row of trays, the evident advantage of a further reduction in bulk and downtime of the icecream-making machine.

It is in fact possible to simultaneously meter a doubled amount of ice cream on withdrawal of as many formed ice creams. For constructional reasons, in this embodiment it is further possible to decrease the distance between the tray rows over that required between two molds of the type shown in FIGS. 3a, 3b arranged side-by-side on related transport butts.

The operation is evident from what has been described and illustrated: having arranged the molds on the fixed frames such that the ends of the plates 11 rest on the transport butts 10, the molds are caused to move forward by the movable frames.

That movement, shown in detail in FIGS. 5 to 8, substantially comprises an upward movement of the movable frames which, through the transport butts associated therewith, lift the molds 2 off the corresponding butts 10 rigid with the fixed frames, then it follows a substantially straight translation over an equal length to the pitch between the butts.

Thus, a generic mold 2 lifted by the movable frame above the butt on which it was previously resting, is located at the next butt.

On reaching this position the movable frame is lowered to lay the mold onto the thus reached transport butt and completes a return stroke of equal length to the previous translation, rearranging itself at the original position.

Since at the areas close to the ends of the frames the transport butts are supported on studs at scaled heights, the molds are gradually raised to provide for the withdrawal of the trays 12 from the tanks 30 or 32.

On reaching the last butt of the fixed frame, the mold is raised from the movable frame and laid in the guide 14 where, owing to the engagement of the yoke 22 with one of its pins 34 and following translation of the carriage 23 on the slide 25 it is transferred orthogonally to path previously completed to be taken to the adjacent frame pair.

With a similar and reverse method to that used for withdrawal, the trays of a generic mold are gradually lowered into the refrigeration means until the product contained therein is fully hardened.

Prior to being raised at the other end of the frames, the molds go through the defrosting tanks 32 (in case after a rapid raising from the tank 30 and reimmersion in the tank 32) and move below the puller 28.

Then, being rearranged on the remote guide 14 from the former, the now empty molds are again translated along the guide to receive, along the travel path on the pair of adjacent frames, a fresh amount of product cream as delivered from the metering assembly 26 and a new set of stick supplied by the related dispenser 27.

Thus, the molds travel continuously in a closed loop path defined by the two frame pairs and two guides arranged at the ends of the frames, and this makes the ease of replacement evident, possibly even with the machine in motion, of groups of molds to effect a change in the size of the icecream produced.

The invention herein is susceptible to many modifications and changes, all of which fall within the scope of the inventive concept. Furthermore, all of the details may be replaced with other technically equivalent elements.

In practicing the invention, the materials used and the dimensions may be any ones contingent on requirements and the state of the art.

We claim:

1. A machine for manufacturing frozen food products, in particular ice creams, ice lollies and the like, comprising at least one metering station feeding said molds with the product to be frozen, at least one refrigeration station cooperating with said molds to freeze the food product contained therein, at least one extraction station for withdrawing the frozen products from said molds, and transport means for intermittently advancing said molds along said stations, said transport means comprising at least one pair of frames and a plurality of transport butts, said plurality of transport butts being rigidly associated with said frames, said frames being movable relatively to each other and to said molds, said butts being T-shaped support members and said molds being disposed in channel plates, conforming to said support members.

2. A machine according to claim 1 wherein said pair of frames each comprise frame ends and legs, said legs extending between said frame ends, said support members each defining a height dimension and being rigidly associated with at least one of said legs, said height dimension defined by each of said support members being increasingly greater towards said ends of said frame.

3. A machine according to claim 1 further comprising a machine bed and second transport means for intermittently shifting said molds from said pair of frames for imparting to said molds a closed loop travel path, said second means comprising bearing guide means, at least one telescoping element having an extensible arm, at least one slide and at least one carriage, said extensible arm being movable toward and from said frames, each of said molds having rigidly associated therewith at least one pin, said yoke being carried by said extensible arm and adapted for engagement with said at least one pin, said telescoping element being connected to said carriage, said bearing guide being adapted for guiding said molds, said slide extending substantially parallel to said bearing guide and being supported on said machine bed, said carriage being adapted for movement along said slide.

4. A machine according to claim 1 wherein each of said molds comprises a supporting plate, a plurality of trays, and at least one pin, said plurality of trays being rigidly associated with and extending from said supporting plate, said at least one pin protruding from said supporting plate and being adapted for allowing said mold to be entrained, said supporting plate defining a substantially n-shaped configuration adapted for upwardly partially enveloping said support members.

5. A machine according to claim 4 wherein said plurality of trays comprises at least one row of trays associated with said supporting plate, wherein said pin protrudes upwardly from said supporting plate along a pin axis, and wherein each tray in said plurality of trays extends downwardly from said supporting plate along a tray axis, said pin axis lying in a plane substantially parallel to said tray axis.

6. A machine for manufacturing frozen food products, in particular ice creams, ice lollies and the like, comprising at least one metering station feeding said molds with the product to be frozen, at least one refrigeration station cooperating with said molds to freeze the food product contained therein, at least one extraction station for withdrawing the frozen products from said molds, and transport means for intermittently advancing said molds along said stations, said transport means comprising at least one pair of frames, movable relatively to each other and to said molds, said pair of frames each comprising frame ends and legs, said legs extending between said frame ends, said support members each defining a height dimension and being rigidly associated with at least one of said legs, said height dimension defined by each of said support members being increasingly greater towards said ends of said frame.

7. A machine for manufacturing frozen food products, in particular ice creams, ice lollies and the like, comprising at least one metering station feeding said molds with the product to be frozen, at least one refrigeration station cooperating with said molds to freeze the food product contained therein, at least one extraction station for withdrawing the frozen products from said molds, and transport means for intermittently advancing said molds along said stations, said transport means comprising at least one pair of frames, movable relatively to each other and to said molds, said machine further comprising a machine bed and second transport means for intermittently shifting said molds from said pair of frames for imparting to said molds a closed loop travel path, said second means comprising bearing guide means, at least one telescoping element having an extensible arm, at least one slide and at least one carriage, said extensible arm being movable toward and from said frames, each of said molds having rigidly associated therewith at least one pin, said yoke being carried by said extensible arm and adapted for engagement with said at least one pin, said telescoping element being connected to said carriage, said bearing guide being adapted for guiding said molds, said slide extending substantially parall to said bearing guide and being supported on said machine bed, said carriage being adapted for movement along said slide.

8. A machine according to claim 7 wherein said pair of frames each comprise frame ends and legs, said legs extending between said frame ends, said support members each defining a height dimension and being rigidly associated with at least one of said legs, said height dimension defined by each of said support members being increasingly greater towards said ends of said frame.

9. A machine according to claim 6 further comprising a machine bed and second transport means for intermittently shifting said molds from said pair of framed for imparting to said molds a closed loop travel path, said second means comprising bearing guide means, at least one telescoping element having an extensible arm, at least one slide and at least one carriage, said extensible arm being movable toward and from said frames, each of said molds having rigidly associated therewith at least one pin, said yoke being carried by said extensible arm and adapted for engagement with said at least one pin, said telescoping element being connected to said carriage, said bearing guide being adapted for guiding said molds, said slide extending substantially parallel to said bearing guide and being supported on said machine bed, said carriage being adapted for movement along said slide.

10. A machine according to claim 6 wherein each of said molds comprises a supporting plate, a plurality of trays, and at least one pin, said plurality of trays being rigidly associated with and extending from said supporting plate, said at least one pin protruding from said supporting plate and being adapted for allowing said mold to be entrained, said supporting plate defining a substantially n-shaped configuration adapted for upwardly partially enveloping said support members.

11. A machine according to claim 10 wherein said plurality of trays comprises at least one row of trays associated with said supporting plate, wherein said pin protrudes upwardly from said supporting plate along a pin axis, and wherein each tray in said plurality of trays extends downwardly from said supporting plate along a tray axis, said pin axis lying in a plane substantially parallel to said tray axis.

12. A machine for manufacturing frozen food products, in particular ice creams, ice lollies and the like, comprising at least one metering station feeding said molds with the product to be frozen, at least one refrigeration station cooperating with said molds to freeze the food product contained therein, at least one extraction station for withdrawing the frozen products from said molds, and transport means for intermittently advancing said molds along said stations, said transport means comprising at least one pair of frames and a plurality of transport butts, said plurality of transport butts being rigidly associated with said frames, said frames being movable relatively to each other and to said molds, said butts being shaped support members and said molds being disposed in channel plates, conforming to said support members, said pair of frames each comprising frame ends and legs, said legs extending between said frame ends, said support members each defining a height dimension and being rigidly associated with at least one of said legs, said height dimension defined by each of said support members being increasingly greater towards said ends of said frame.

13. A machine for manufacturing frozen food products, in particular ice creams, ice lollies and the like, comprising at least one metering station feeding said molds with the product to be frozen, at least one refrigeration station cooperating with said molds to freeze the food product contained therein, at least one extraction station for withdrawing the frozen products from said molds, and transport means for intermittently advancing said molds along said stations, said transport means comprising at least one pair of frames and a plurality of transport butts, said plurality of transport butts being rigidly associated with said frames, said frames being movable relatively to each other and to said molds, said butts being shaped support members and said molds being disposed in channel plates, conforming to said support members, said machine further comprising a machine bed and second transport means for intermittently shifting said molds from said pair of frames for imparting to said molds a closed loop travel path, said second means comprising bearing guide means, at least one telescoping element having an extensible arm, at least one slide and at least one carriage, said extensible arm being movable toward and from said frames, each of said molds having rigidly associated therewith at least one pin, said yoke being carried by said extensible arm and adapted for engagement with said at least one pin, said telescoping element being connected to said carriage, said bearing guide being adapted for guiding said molds, said slide extending substantially parallel to said bearing guide and being supported on said machine bed, said carriage being adapted for movement along said slide.

* * * * *